United States Patent [19]

Law

[11] 4,319,777

[45] Mar. 16, 1982

[54] TROOP CARRIER

[75] Inventor: William J. H. Law, Port Chester, N.Y.

[73] Assignee: AAL Enterprises, Inc., New York, N.Y.

[21] Appl. No.: 143,447

[22] Filed: Apr. 24, 1980

[51] Int. Cl.³ .............................................. B60N 1/00
[52] U.S. Cl. ....................................... 296/64; 296/14; 297/244
[58] Field of Search ....................... 296/63, 64, 36, 14; 297/244

[56] References Cited

U.S. PATENT DOCUMENTS

| 1,410,193 | 3/1922 | Klemm | 296/14 |
| 2,704,989 | 3/1955 | Konecny | 296/64 |
| 3,392,798 | 7/1968 | Sipe | 296/64 |
| 4,188,060 | 2/1980 | Alcanzare | 296/63 |

Primary Examiner—Robert R. Song
Attorney, Agent, or Firm—Brooks, Haidt, Haffner & Delahunty

[57] ABSTRACT

A troop carrier for transporting and deploying troops which includes an armored panel extending lengthwise of the carrier in an approximately upright position having an exterior side set inwardly from one side of the carrier, a side panel on the carrier located along the side of the carrier on the exterior side of the armored panel, the side panel being pivotally mounted along the lower edge thereof.

2 Claims, 4 Drawing Figures

TROOP CARRIER

This invention relates to military vehicles and in particular provides a troop carrier for transporting and deploying ground troops.

One common form of troop carrier used in deploying ground troops is a motorized truck having a rear body portion with half-or three-quarter height side panels. Overhead covering is frequently provided in the form of a canvas top, and access to the interior of the rear body portion is through a tailgate which drops down to provide clear access into the interior of the rear of the truck at floor level. Such a carrier is conventionally provided with two rows of seats, each against a side panel such that troops can be carried in the truck seated on the seats facing each other with their equipment stowed between them.

This type of carrier has a disadvantage that the troops are all exposed and when rapid evacuation is required it must be through the rear opening and usually not more than two persons at a time.

It is thus an important object of this invention to provide a troop carrier vehicle providing some measure of protection for the troops while being transported and permitting rapid evacuation of the troops in the event of an emergency.

These and other objects of this invention are obtained utilizing a troop carrier of otherwise conventional construction in which the troop carrying body portion located on the rear portion of the truck or other vehicle is provided with an elongated, approximately upright, armored panel extending lengthwise of the troop carrier body portion and located inwardly of the sides of the body portion a sufficient distance to permit troops to be seated an exteriorly exposed side of the panel.

The carrier body portion is also provided with a side panel extending lengthwise of the body portion located on the exterior side of the armored panel and which is hinged along its lower edge such that it can be moved from a vertical position to a position swung outwardly away from the body portion providing clear access to the interior of the carrier body portion from the side of the vehicle to enable troops sitting in seats in front of the armored panel to exit simultaneously thus enabling rapid evacuation.

Preferably the side panel is provided with a latch having an operating mechanism located conveniently for operation by the troop leader or other person in command.

Preferably the vehicle is provided on both sides of the carrier portion with such an arrangement such that there is a space between the armored panels enabling storage of arms and other equipment or for transporting wounded. Preferably the armored panel or panels are of a height sufficient to provide protection for the seated troops such that while exposed on the side which they face they are protected from the rear while being transported and while evacuating the carrier.

For a more complete understanding the practical applications of this invention reference is made to the appended drawings in which.

Figure 1:
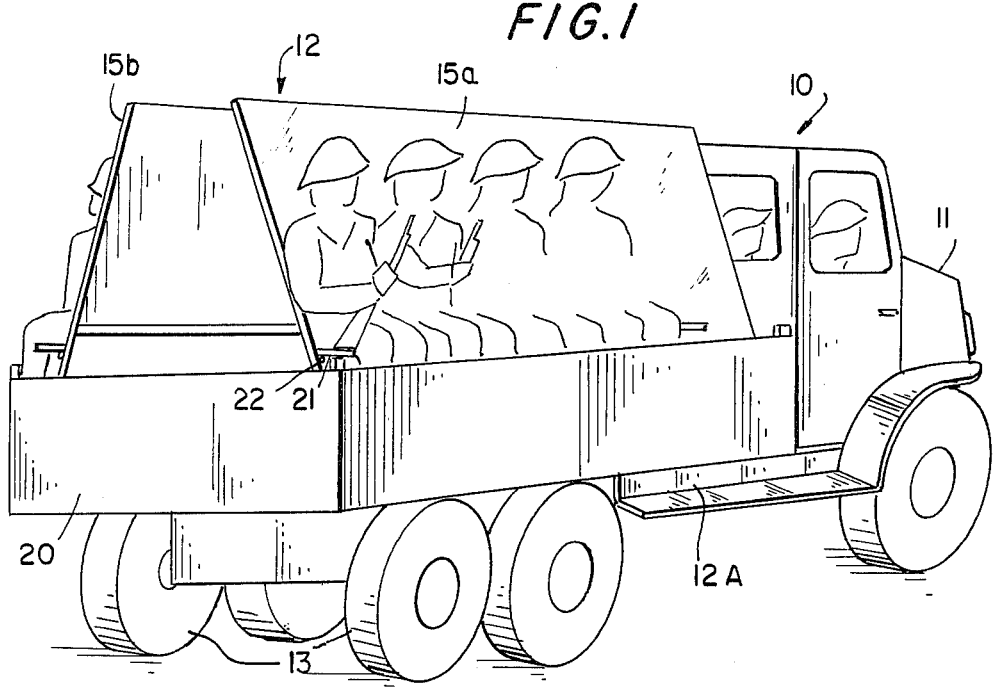
FIG. 1 is a perspective view of a troop carrier in accordance with this convention.

Referring more particularly to FIG. 1 the reference numeral 10 designates a motorized troop carrier such as a 6×6 truck. Truck 10 is provided to the rear of its cab 11 with a carrier body 12 in accordance with this invention resting on the chassis 12A and extending over the rear wheels 13.

Figure 3:
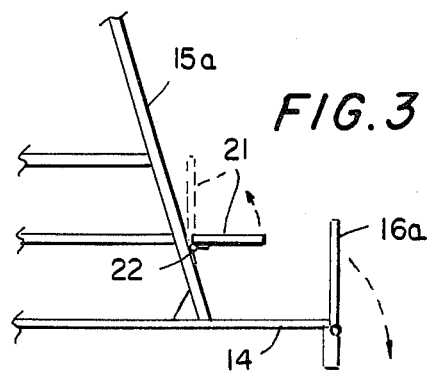
FIG. 3 is a schematic view illustrating the operation of the side panels of the carrier shown in FIGS. 1 and 2.
Figure 4:
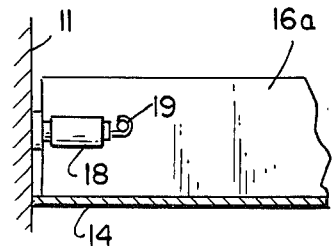
FIG. 4 is a schematic, fragmentary view of a latch mechanism utilized in retaining the side panels in vertical position.

Body portion 12 is provided with a floor 14 of conventional construction (shown only in FIG. 3).

A pair of armor plate panels 15a and 15b are rigidly mounted in body portion 12 extending lengthwise of body portion 12 in approximately upright position resting on floor 14. Panel 15a is located on the right side of the vehicle spaced inwardly from the outer side of floor 14a sufficient distance to permit seating of troops between panel 15a and the right side of vehicle 10. Panel 15b is similarly positioned on the left side of vehicle 10. Preferably panels 15a and 15b are canted inwardly at their upper ends such that they sit at an angle from the vertical to facilitate the seating of troops in front of panels 15a and 15b.

Body portion 12 of vehicle 10 is further provided with side panels 16a and 16b running lengthwise of body portion 12, side panel 16a being on the outer side of floor 14 along the right of the truck and side panel 16b being on the outer side of floor 14 on the left side of the truck. Panels 16a and b are approximately the same length as armor plate panels 15a and 15b, and are hingedly fastened at their lower edge, for example to floor 14 as indicated in FIG. 3 by the reference numeral 17. Each side panel 16a and 16b is retained normally in an upright position by a latch mechanism, such as a spring loaded latch 18 mounted on the inside of the side panel which cooperates with a detent located in the rear wall of cab 11 and which can be released against spring biasing by pulling on a handle 19.

Preferably body portion 12 of vehicle 10 is provided with a rear end panel, such as a tailgate 20, which can be hinged to floor 14 and latched to armor panels 15a and 15b at their rear ends for retention in upright position. Side panels 16a and 16b can also be provided with releasable latch mechanisms securing them to rear panel 20.

Seats are provided backing up against panels 15a and 15b on their exterior sides, that is, the sides facing side panels 16a and 16b, respectively. As shown in FIG. 3 such seats can be in the form of boards 21 which are horizontally positioned at the appropriate height extending lengthwise along the exterior side of panels 15a and 15b to which they can be hingedly attached, as indicated at 22. Latches (not shown) or removeable props (not shown) are required to retain the seats in horizontal position. Such latches or props can be disengaged to permit boards 21 to be lowered flat against the exterior surfaces of panels 15a and 15b in order to permit loading and unloading the compartment between panels 15a and b and their associated side panels 16a and 16b, respectively.

Vehicle 10 is employed in transportation and deployment of armed troops generally where rapid ground deployment is required. In loading vehicle 10 panels 16a and 16b are lowered, as shown in dashed lines in FIGS. 1, 2, and 3, be releasing the latch mechanisms to permit boarding by the troops, Seats 21 are placed in horizontal position such that the troops sit with their backs to armored panels 15a and 15b facing outwardly of the side of the vehicle. Side panels 15a and 15b are then raised and latched in position.

The release mechanisms for the latches should be located where they are accessible to the person in command. Remote release mechanisms may be desirable, particularly where the commander is located in the cab 11 of the vehicle 10.

Supplies and other material can be stored in the space 22 located between panels 15a and 15b where such storage is required. Where the weather requires, canvas tops 23 can be mounted on the top edges of panels 15a and 15b.

Figure 2:
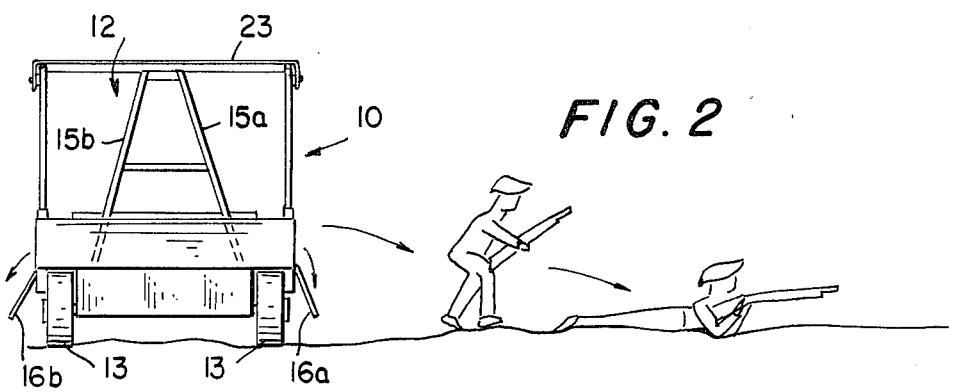
FIG. 2 is a rear elevation of the carrier shown in FIG. 1.

When it is necessary to evacuate the vehicle, for example, in the event of surprise attack, releasing the latches for panels 16a and 16b permits them to drop out enabling complete leg clearance for simultaneous evacuation of all troops in the carrier 12 as schematically indicated in FIG. 2. At the same time where the attack is from one side of the vehicle the troops on the other side who cannot see the attack are protected by the panels 15a and 15b while they evacuate the vehicle. I claim:

1. A troop carrier vehicle having a carrier body adapted to transporting troops which includes an armored panel extending lengthwise of said body in approximately upright position having an exterior side set inwardly from one side of said body, a side panel on said body located along said one side of said body on said exterior side of said armored panel, said side panel being pivotly mounted along the lower edge thereof whereby said side panel can be lowered from an upright position in front of said armored panel outwardly of said body portion and seating means positioned along the exterior side of said armored panel between said armored panel and said side panel.

2. A troop carrier vehicle having a body portion according to claim 1 which further comprises second armored panel, side panel and seating means according to claim 1 positioned along the other side of said body.

* * * * *